US012224703B2

(12) United States Patent
Au et al.

(10) Patent No.: US 12,224,703 B2
(45) Date of Patent: Feb. 11, 2025

(54) FIXED DC BUS AND HYDROGEN GENERATION SYSTEM

(71) Applicant: NEXTracker LLC, Fremont, CA (US)

(72) Inventors: Alexander W. Au, Oakland, CA (US); Venkata Rahul Abbaraju, Fremont, CA (US); Yang Liu, Mountain View, CA (US); Wesley Chu, Irvine, CA (US)

(73) Assignee: NEXTRACKER LLC, Fremont, CA (US)

(*) Notice: Subject to any disclaimer, the term of this patent is extended or adjusted under 35 U.S.C. 154(b) by 348 days.

(21) Appl. No.: 17/389,192

(22) Filed: Jul. 29, 2021

(65) Prior Publication Data

US 2022/0038049 A1 Feb. 3, 2022

Related U.S. Application Data

(60) Provisional application No. 63/058,293, filed on Jul. 29, 2020.

(51) Int. Cl.
*H02S 40/32* (2014.01)
*H02J 3/38* (2006.01)
(Continued)

(52) U.S. Cl.
CPC .............. *H02S 40/32* (2014.12); *H02J 3/381* (2013.01); *H02J 7/342* (2020.01); *H02J 15/008* (2020.01);
(Continued)

(58) Field of Classification Search
CPC ......... H02S 40/32; H02J 15/008; H02J 7/342; H02J 3/381; H02J 2300/26; H02J 2207/30
See application file for complete search history.

(56) References Cited

U.S. PATENT DOCUMENTS 6,902,837 B2 * 6/2005 McCluskey ......... H01M 16/003
307/64
7,248,490 B2 7/2007 Olsen et al.
(Continued)

FOREIGN PATENT DOCUMENTS

CN 201976034 U 9/2011
CN 104659835 A 5/2015
(Continued)

OTHER PUBLICATIONS

PCT Search Report and Written Opinion issued in PCT/US2021/043778 dated Dec. 6, 2021, 16 pages.
(Continued)

*Primary Examiner* — Lincoln D Donovan
*Assistant Examiner* — James G Yeaman
(74) *Attorney, Agent, or Firm* — Fredrikson & Byron, P.A.

(57) ABSTRACT

A distributed direct current power system including an inverter to invert DC to alternating current (AC), a plurality of photovoltaic (PV) strings, and a plurality of maximum power point tracking (MPPT) converters coupled between the plurality of photovoltaic (PV) strings, respectively, and the central inverter, the plurality of MPPT converters configured to maximize solar power production by the plurality of PV strings and minimize mismatch between the plurality of PV strings. The system also including a plurality of batteries, a plurality of DC-DC battery converters (DCBC) coupled to the plurality of batteries and configured to manage charge and discharge of the plurality of batteries, enable interconnection of the plurality of PV strings and the plurality of batteries, and supply a constant medium DC voltage to the central inverter, and a hydrogen generation system in electrical communication with the inverter, the photovoltaic strings, or the batteries.

15 Claims, 9 Drawing Sheets

(51) Int. Cl.
*H02J 7/34* (2006.01)
*H02J 15/00* (2006.01)

(52) U.S. Cl.
CPC ....... *H02J 2207/30* (2020.01); *H02J 2300/26* (2020.01)

(56) References Cited

U.S. PATENT DOCUMENTS

| | | | |
|---|---|---|---|
| 8,427,009 | B2 | 4/2013 | Shaver et al. |
| 8,929,038 | B2 | 1/2015 | Strobl et al. |
| 9,654,028 | B1 | 5/2017 | Luo et al. |
| 9,680,304 | B2 | 6/2017 | Adest et al. |
| 9,853,490 | B2* | 12/2017 | Adest ................. H02J 7/35 |
| 2004/0126641 | A1* | 7/2004 | Pearson ............ H01M 8/249 |
| | | | 429/418 |
| 2011/0045332 | A1 | 2/2011 | Horne et al. |
| 2011/0133556 | A1 | 6/2011 | Choi |
| 2011/0140535 | A1 | 6/2011 | Choi et al. |
| 2011/0148205 | A1 | 6/2011 | Moon |
| 2011/0215640 | A1 | 9/2011 | Donnelly et al. |
| 2011/0229780 | A1* | 9/2011 | Kershaw ........ H01M 8/04626 |
| | | | 204/228.1 |
| 2012/0319489 | A1 | 12/2012 | McCaslin et al. |
| 2014/0195177 | A1 | 7/2014 | Kang et al. |
| 2015/0349708 | A1 | 12/2015 | Moslehi |
| 2016/0344231 | A1 | 11/2016 | Bridwell |
| 2017/0093187 | A1 | 3/2017 | Park et al. |
| 2019/0341776 | A1* | 11/2019 | Au .......................... H02S 40/32 |

FOREIGN PATENT DOCUMENTS

| | | | |
|---|---|---|---|
| CN | 104662484 | A | 5/2015 |
| CN | 104767470 | A | 7/2015 |
| CN | 109599935 | A | 4/2019 |
| CN | 110299722 | A | 10/2019 |
| EP | 2437387 | A2 | 4/2012 |
| JP | 3493644 | B2 | 2/2004 |
| KR | 20090059389 | A * | 6/2009 |
| KR | 20110029730 | A * | 3/2011 |
| WO | 2008132551 | A2 | 11/2008 |
| WO | 2010130273 | A1 | 11/2010 |
| WO | 2014163044 | A1 | 10/2014 |
| WO | 2019213546 | A1 | 11/2019 |
| WO | 2019246433 | A1 | 12/2019 |

OTHER PUBLICATIONS

Zhou et al. Optimal energy management strategy and system sizing method for stand-alone photovoltaic-hydrogen systems International Journal of Hydrogen Energy 33, Published Nov. 26, 2007, pp. 477-489.

European Patent Office "Extended European Search Report" From Application No. 21849902.8, Dated Oct. 2, 2024, p. 11.

* cited by examiner

FIXED DC BUS AND HYDROGEN GENERATION SYSTEM

FIELD

This disclosure is generally directed to solar power generating systems. More particularly, this disclosure is directed to solar power systems and methods utilizing distributed DC-DC battery converters, DC power transmission, and centralized power inversion.

BACKGROUND

Solar and wind energy are increasingly important renewable, non-polluting energy sources for consumers and businesses throughout the world. For solar energy, photovoltaic (PV) panels arranged in an array or string typically provide the means to convert solar energy into electrical energy. In operating photovoltaic (PV) arrays, maximum power point tracking (MPPT) is generally used to automatically determine a voltage or current at which the PV array should operate to generate a maximum power output for a particular temperature and solar irradiance. Although MPPT allows for the generation of maximum output power, the transmission and storage of the power generated by the PV arrays may be inefficient and costly.

SUMMARY

A distributed direct current power system including an inverter to invert DC to alternating current (AC), a plurality of photovoltaic (PV) strings, and a plurality of maximum power point tracking (MPPT) converters coupled between the plurality of photovoltaic (PV) strings, respectively, and the central inverter, the plurality of MPPT converters configured to maximize solar power production by the plurality of PV strings and minimize mismatch between the plurality of PV strings. The system also including a plurality of batteries, a plurality of DC-DC battery converters (DCBC) coupled to the plurality of batteries and configured to manage charge and discharge of the plurality of batteries, enable interconnection of the plurality of PV strings and the plurality of batteries, and supply a constant DC voltage to the central inverter, and a hydrogen generation system in electrical communication with the inverter, the photovoltaic strings, or the batteries.

Implementations may include one or more of the following features. The power system may include a DC bus coupled to the inverter, the power plant, the plurality of batteries, and the hydrogen generation system. The DC bus may be a fixed DC bus. The hydrogen generation system may include a hydrogen generator. The hydrogen generation system may include vessels coupled to the hydrogen generator. A first vessel of the vessels may be configured to store hydrogen and a second vessel of the vessels may be configured to store oxygen. The vessels may include portable vessels.

The hydrogen generation system may include a hydrogen-powered gen-set coupled to a vessel of the vessels and positioned in proximity to the power plant. The hydrogen generation system may include a fuel cell fluidically coupled to a vessel of the vessels. The power system may include a DC bus electrically coupled to the fuel cell. The power plant may include photovoltaic (PV) strings. The power plant may include a wind power plant, a hydroelectric power plant, a geothermal power plant, a bio-mass power plant, a gas-fired power plant, a coal-fired power plant, or a nuclear power plant. The constant DC voltage may be a constant, medium DC voltage

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The solar power systems of this disclosure incorporate centralized AC inversion, distributed DC solar, and storage power management. The distributed DC power system includes the following components:

1. A centralized or central inverter 102 for power inversion from DC to AC;
2. Distributed MPPT converters 112*a*-112*n* to maximize solar power production and minimize mismatch between DC solar strings; and
3. Distributed DC-DC battery converters (DCBCs) manage battery charge and discharge as well as enable the interconnection of DC-coupled PV strings and the batteries This architecture dedicates power electronics components for PV, battery, and grid connection, allowing flexibility in component selection based on specific PV-to-storage sizing ratios. The sizing is independent of grid interconnection capacity requirements and/or constraints.

Figure 1:
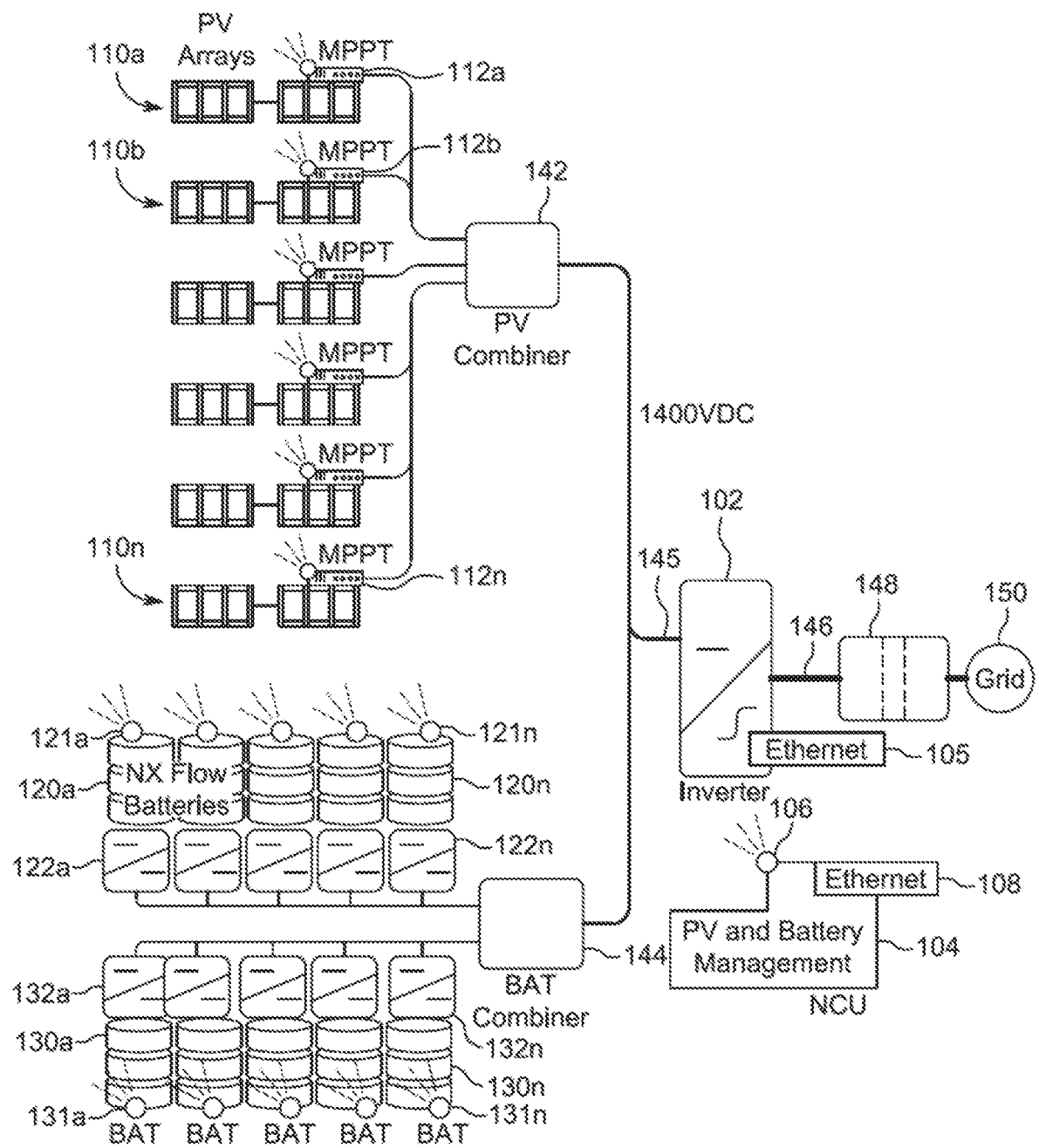
FIG. 1 is a schematic diagram of a central inverter and a distributed DC battery management system according to an embodiment of this disclosure.

FIG. 1 depicts an example power system of this disclosure. The power system includes a central inverter 102 and distributed DC battery management components. The central inverter 102 may be a single-stage inverter incorporating three pairs of transistors, e.g., silicon carbide (SiC) metal-oxide-semiconductor field-effect transistors (MOSFETs), electrically connected in parallel. Since the cost of SiC MOSFETs has decreased, the central inverter 102 can be a cost-effective, high-voltage, and low-current device. The central inverter 102 may also incorporate a filter, e.g., an RL filter, connected to the outputs of the transistors. The central inverter 102 may be connected to a controller (not shown), which may use a pulse width modulation (PWM) technique, e.g., sinusoidal (PWM), to control the SiC MOSFETs. The central inverter 102 is electrically connected to a grid 150 (e.g., a utility grid) via an AC power line 146 and a transformer 148.

The power system of FIG. 1 also includes a network control unit (NCU) 104. The NCU 104 is designed to communicate with the customer and provide site-level energy management commands via a wireless communication device 106 or a wired communication device, e.g., an Ethernet communications interface 108. The NCU 104 also communicates with DC-DC battery converters (DCBCs) 122a-122n, 132a-132n via respective wireless communication devices 121a-121n, 131a-131n, and with each PV maximum power point tracking (MPPT) converter unit 112a, 112b, ..., 112n. The NCU 104 also coordinates with the central inverter 102 for overall system start-up and shut-down. The central inverter 102 may include an Ethernet communications interface 105 through which the NCU may communicate with the central inverter 102. The system may include distributed Tracker-level Power Optimizer (TPO) converters (e.g., TPO system 900) to maximize solar power production and minimize the mismatch between PV strings or arrays 110a-110n.

Figure 2:
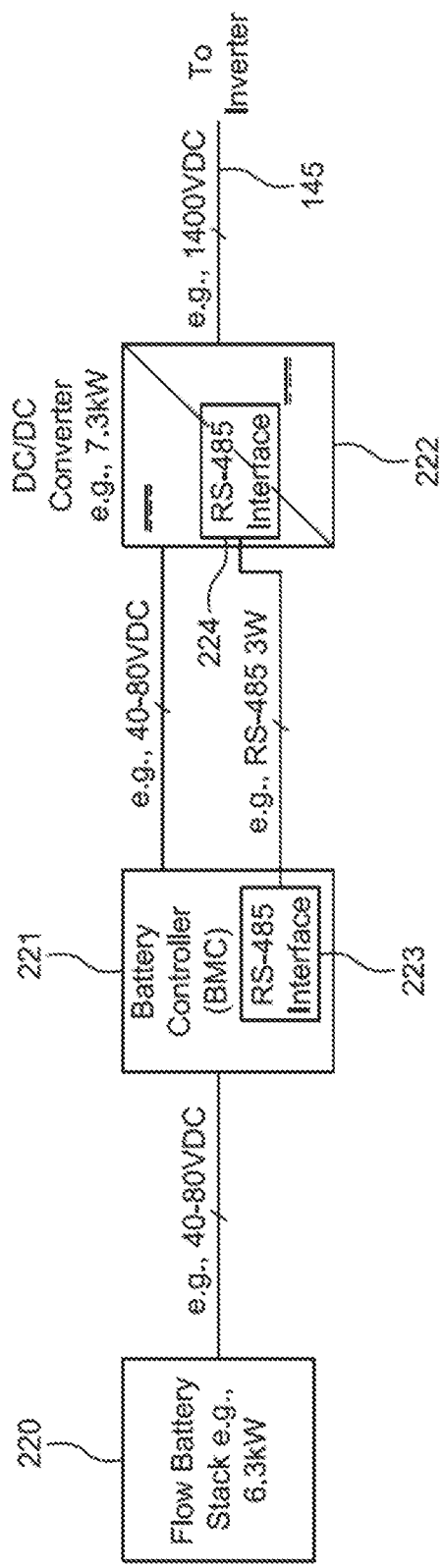
FIGS. 2 and 3 are schematic diagrams of DC-DC battery converters according to embodiments of this disclosure.
Figure 3:
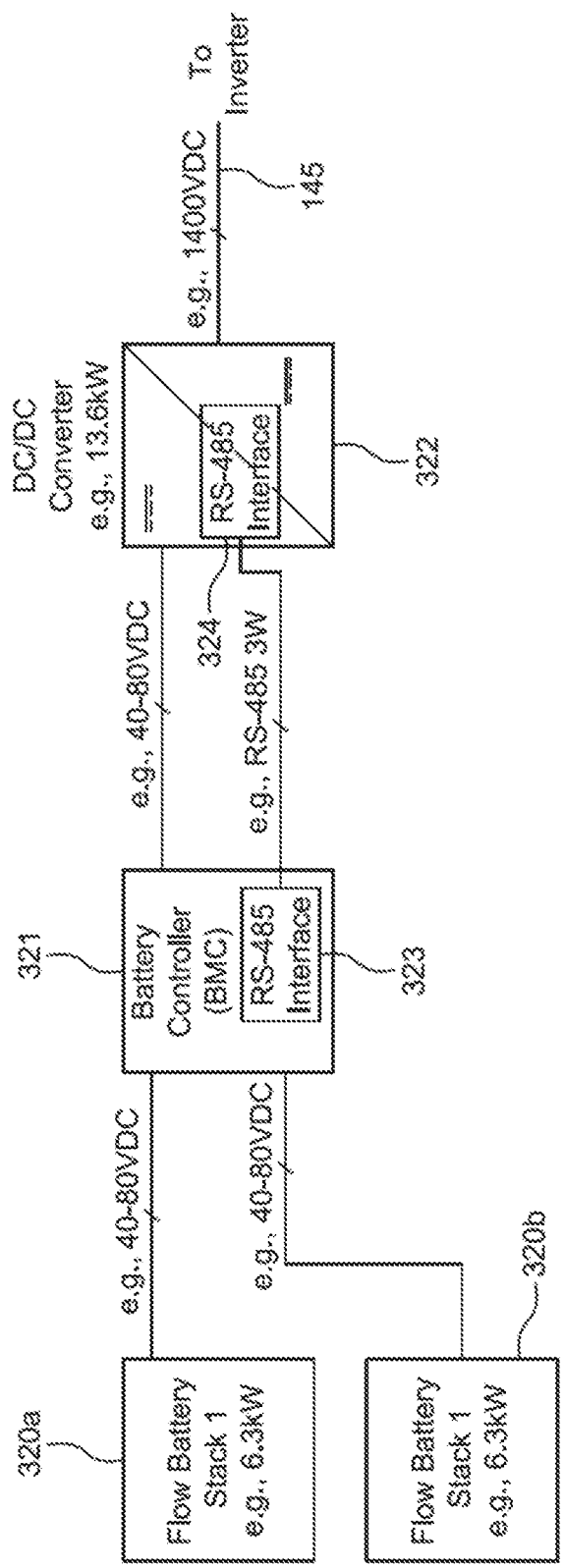

FIGS. 2 and 3 depict two different DC-DC battery converters (DCBCs) 222, 322. DCBC 322 is configured for multiple flow battery stacks 320a, 320b and thus has a higher power rating than DCBC 222. In embodiments, the DCBC 222 is a 7.3 kW solution and the DCBC 322 is a 13.6 kW solution. Example specifications for the DC-DC battery converters 222, 322 are depicted in Table 1 below:

TABLE 1

Example DCBC Specifications

| Electrical | |
| --- | --- |
| Isolation | Galvanic isolation >2500 VDC |
| Nominal Power | Option 1 7.6 kW |
| | Option 2 13.9 kW |
| Nominal Input Voltage | 40 to 80 VDC |
| Nominal Output Voltage | 1400 VDC |
| Maximum Output Voltage | 1500 VDC |
| Maximum Input Current | Option 1 190 A |
| | Option 2 347 A |
| Efficiency | >96% |
| Input Current Ripple | <10 A |
| Environmental | |
| Protection | Open frame or module, indoor |
| Cooling | Air-cooled |
| Operating Temperature | −20 to 60° C. |
| Storage Temperature | −20 to 50° C. |
| Operating Humidity | 0 to 100% |
| Operating Altitude | 0 to 3000 meters |
| Control Mode | Constant power, constant voltage |
| Physical | |
| Mounting | Flange Mount |
| Maximum Dimension | 330 × 550 × 100 mm |
| Weight | <15 kg |
| Transportation | IEC 60721-3-2 Class 2M2 |
| Communication | |
| Serial | RS485 (isolated), Modbus ETU |
| Compliance | |
| Regulatory | UL1741 Stand-alone |
| EMI | FCC Class A |

As shown in FIGS. 2 and 3, the DC-DC battery converters (DCBCs) 222, 322 charge and discharge flow battery stacks 220, 320a, 320b (e.g., vanadium flow battery (VFB) stacks) in response to external commands. These commands may be transmitted by battery management controllers 221, 321 via an RS-485 communications devices or interfaces 223, 323 to the DCBCs 222, 322 via an RS-485 communications devices or interfaces 224, 324, for example. A low-voltage side (e.g., 40-80 VDC) of the DCBC 222, 322 connects to the flow battery stacks 220, 320a, 320b, while the high-voltage side (e.g., a constant 1200-1600 VDC) connects to the DC distributed bus or DC bus 145, to which other DCBCs (e.g., DCBCs 122a-122n, 132a-132n) and solar MPPT converters 112a-112n are connected. In one embodiment, the voltage of the DC bus 145 is a nominal 1400 VDC. In other embodiments, the constant voltage of the DC bus is between 1200 VDC and 1600 VDC. As shown in FIG. 2, the NCU 104 may control the voltage of the DC bus 145 as a constant voltage source by sending control signals or messages to the BMCs 221, 321 of each of the DCBCs 122a-122n, 132a-132n via wireless communication devices 121a-121n, 131a-131n, which are connected to respective DCBCs 122a-122n, 132a-132n.

Figure 4:
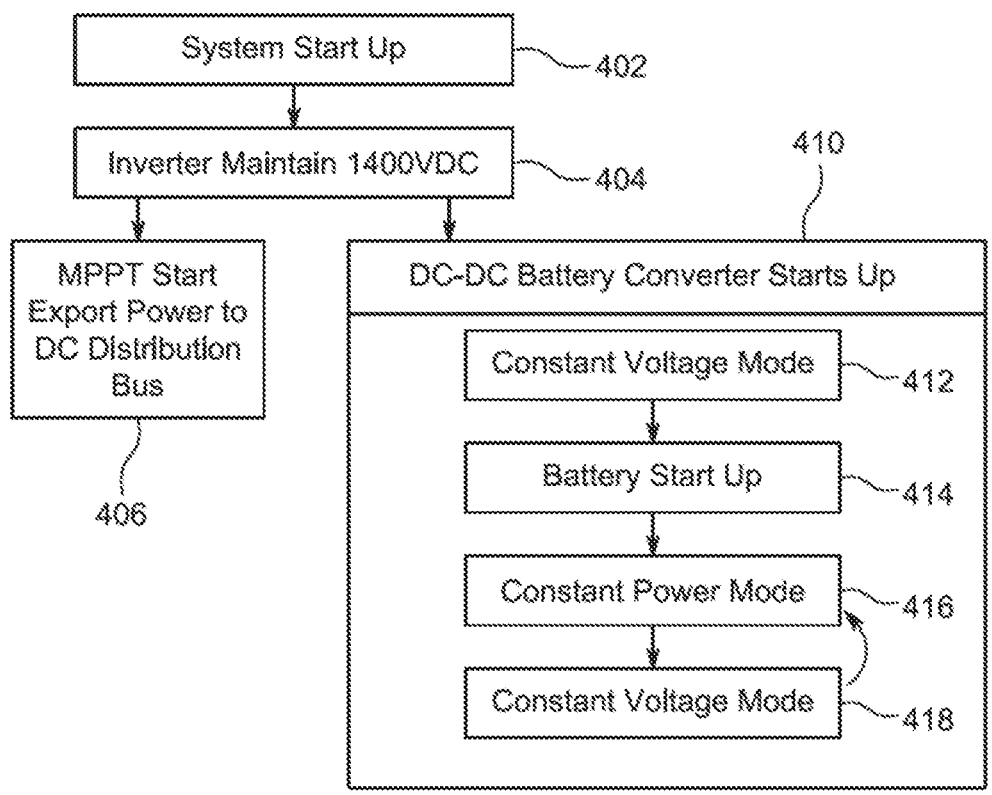
FIG. 4 is a flow diagram of a power system start-up sequence according to an embodiment of this disclosure.

FIG. 4 illustrates a power start-up sequence according to one implementation. While the system starts up, the central inverter 102 starts up first at block 402 and maintains a predetermined medium voltage, e.g., 1400 VDC, on the DC bus 145 at block 404. After the predetermined medium voltage is present on the DC bus 145, the MPPT converters 112a-112n start exporting power to the DC distribution bus or DC bus 145 at block 406, and track the maximum power of the PV arrays 110a-110n.

The start-up 410 of the DCBCs 122a-122n, 132a-132n is based on a command signal or message from the battery management controller (BMC), e.g., BMC 221 or BMC 321 of FIG. 3. Upon start-up, each DCBC 122a-122n, 132a-132n operates in a constant voltage mode at block 412. In one embodiment, the default start-up voltage may be 40 VDC. The BMC 221, 321 manages the battery initial charge at block 414. During this time, a maximum of 2 kW may be drawn from the DCBC low-voltage side. After the battery's initial charge, the DCBC changes to a constant power mode 416 based on a command signal or message from the BMC 221, 321. At the end of a charge or discharge cycle, charge or discharge current reduces, and the DCBC changes to a constant voltage mode at block 418. Thereafter, the DCBC repeats the constant power mode 416 and the constant voltage mode 418 for subsequent charge or discharge cycles While the DCBC 222, 322 operates in a constant voltage mode (e.g., at start-up) it may hold a constant low voltage, e.g., 40V, or a commanded voltage from the BMC 221, 321. Toward the end of a charge or discharge cycle, the DCBC 222, 322 may hold the constant voltage until the current reduces to zero.

Figure 5:
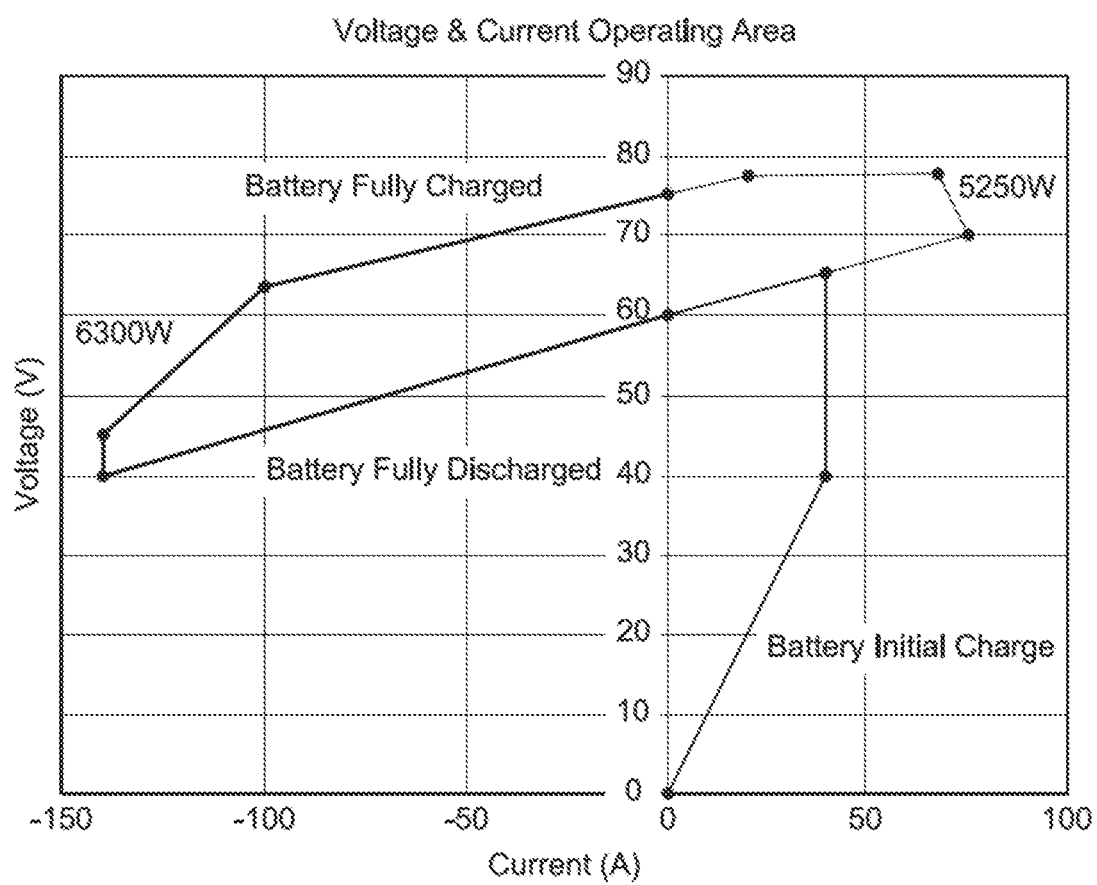
FIG. 5 is a graphical diagram illustrating a battery voltage and current operating curve for a single stack according to an embodiment of this disclosure.

FIG. 5 depicts a voltage and current operating curve during a constant power mode both during charging and discharging. In one embodiment, the DC-DC battery converters 222, 322 may operate through the full range of this curve. The DC-DC battery converters 222, 322 follow the power commands through the RS-485 communications interfaces or connections 224, 324. In some embodiments, approximately 1.3 kW of parasitic or auxiliary load may be required for the flow battery stacks 220, 320a, 320b.

In embodiments, the central or centralized inverter 102 may have a variety of specifications as depicted in Table 2 below:

TABLE 2

Example Centralized Inverter Specifications

| Architecture | Bi-directional single stage power inversion |
| --- | --- |
| Nominal AC Power | >1 MW |
| Nominal AC Voltage | >600 VAC |
| Nominal Frequency | 50 Hz/60 Hz |

TABLE 2-continued

Example Centralized Inverter Specifications

| | |
|---|---|
| Power Factor Support | >0.8 |
| Nominal DC Voltage | 1400 VDC (constant) |
| Maximum DC voltage | 1500 VDC |
| Communication Interface | RS485, Modbus RTU |
| Operating Temperature | −20 to 50° C. |
| Storage Temperature | −20 to 50° C. |
| Operating Humidity | 0 to 100% |
| Operating Altitude | 0 to 3000 meters |
| Enclosure Type | Outdoor 3R |
| Regulatory | UL1741SA, AS/NZ 4777.2, CE compliant, IEEE1547 (2018), IEC68150 |
| EMI | FCC Class A |

Power curtailment operations may be built into components of the system. For example, both the MPPTs 112a-112n and the DCBCs 122a-122n, 132a-132n (e.g., DCBCs 222, 322) have built-in power curtailment curves when the voltage of the DC bus 145 is above 1400 VDC. These curves linearly drop to zero when the voltage of the DC bus 145 is close to 1500 VDC. In one embodiment, the central inverter 102 raises the voltage of the DC bus 145 when the power curtailment command is received from the NCU 104 and or the grid 150, or the output power reaches the maximum allowable to power the grid 150. The central inverter 102 then resumes the constant 1400 VDC when the above conditions are cleared. In one embodiment, the NCU 104 communication with the TPO system 900 or SPCs 610, 710 and the DCBCs allows for constant power output during cloud cover independent of the control of the central inverter 102. In some embodiments, the outputs of the TPO system 900 and DCBCs may be designed to output a constant 1400 VDC nominal (1500 VDC maximum). The central inverter 102 also operates at constant input voltage. Standard PV combiner boxes (e.g., PV combiner 142 and battery combiner 144) may be used for combining both the PV arrays 110a-110n and the flow batteries 120a-120n, 130a-130n.

In embodiments, the solar power control system may be designed to operate for both on- and off-grid applications and may perform one or more functions including:
1. Grid voltage and frequency regulation;
2. Multiple inverters in parallel; and
3. Intentional islanding.

Figure 6:
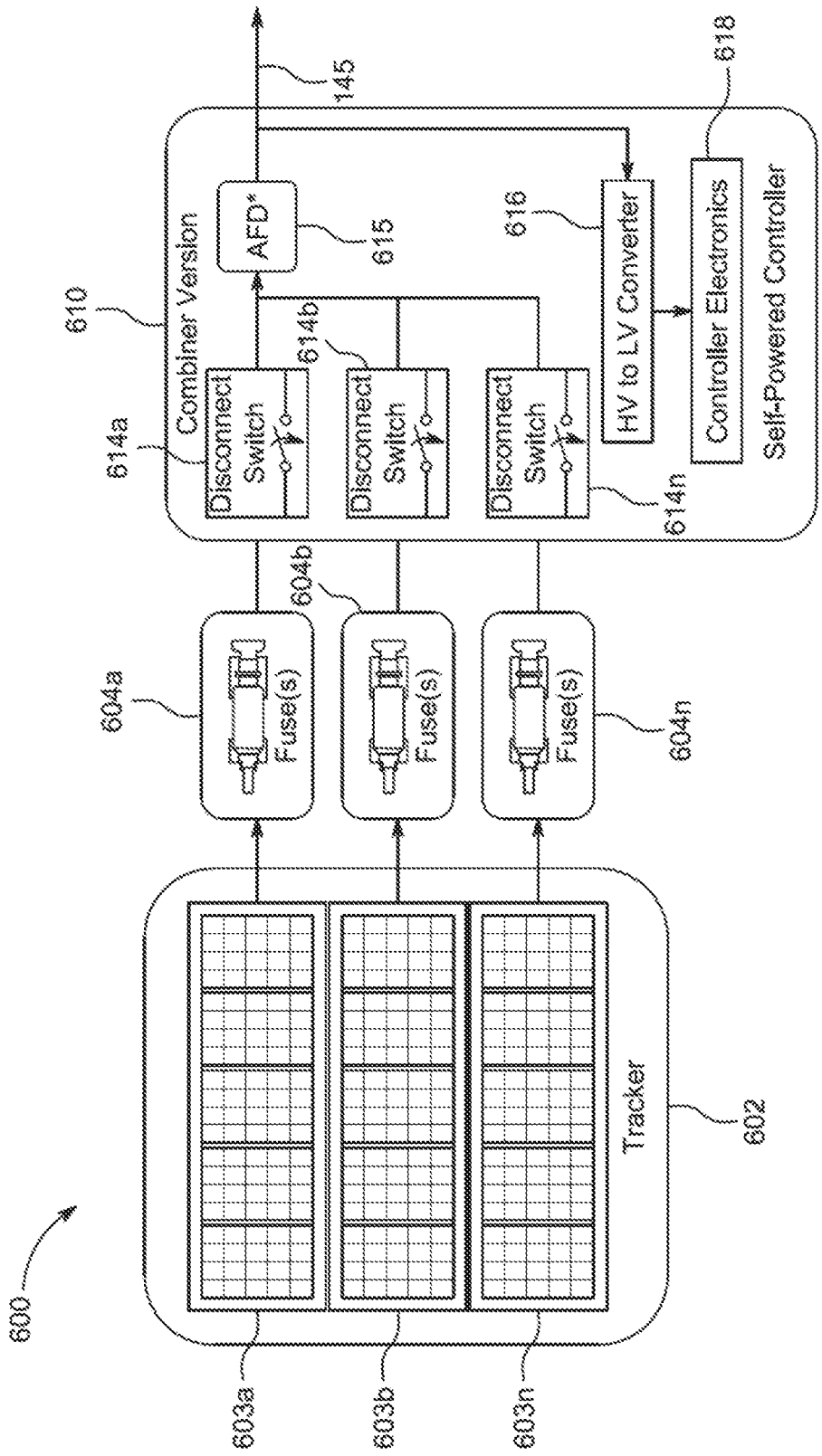
FIGS. 6 and 7 are schematic diagrams of control systems according to embodiments of this disclosure.

FIG. 6 depicts a combiner version of a solar tracker control system 600 according to an embodiment. The control system 600 includes a tracker 602 with PV arrays 603a-603n. The PV arrays 603a-603n are connected to respective fuses 604a-604n. The fuses 604a-604n, in turn, are connected to respective disconnect switches 614a-614n of the self-powered controller (SPC) 610, which may be implemented in the PV combiner 142 of FIG. 1. The outputs of the disconnect switches 614a-614n are connected together to an arc fault detector (AFD) 615, the output of which is provided to the central inverter 102 via the DC bus 145 of FIG. 1. The AFD 615 monitors and analyzes patterns in electrical current and/or voltage waveforms output from the PV arrays 603a-603n. When the AFD 615 senses a wave pattern indicating a potentially dangerous arc, the AFD 615 causes the disconnect switches 614a-614n to open.

The output from the arc fault detector 615 is also connected to a high voltage (HV) to low voltage (LV) converter 616, which converts the voltage on the DC bus 145 to a lower voltage, which is used to power the controller electronics 618. The controller electronics 618 may include driver circuitry (not shown) for driving an electric motor (not shown) of the solar tracker 602.

Figure 7:
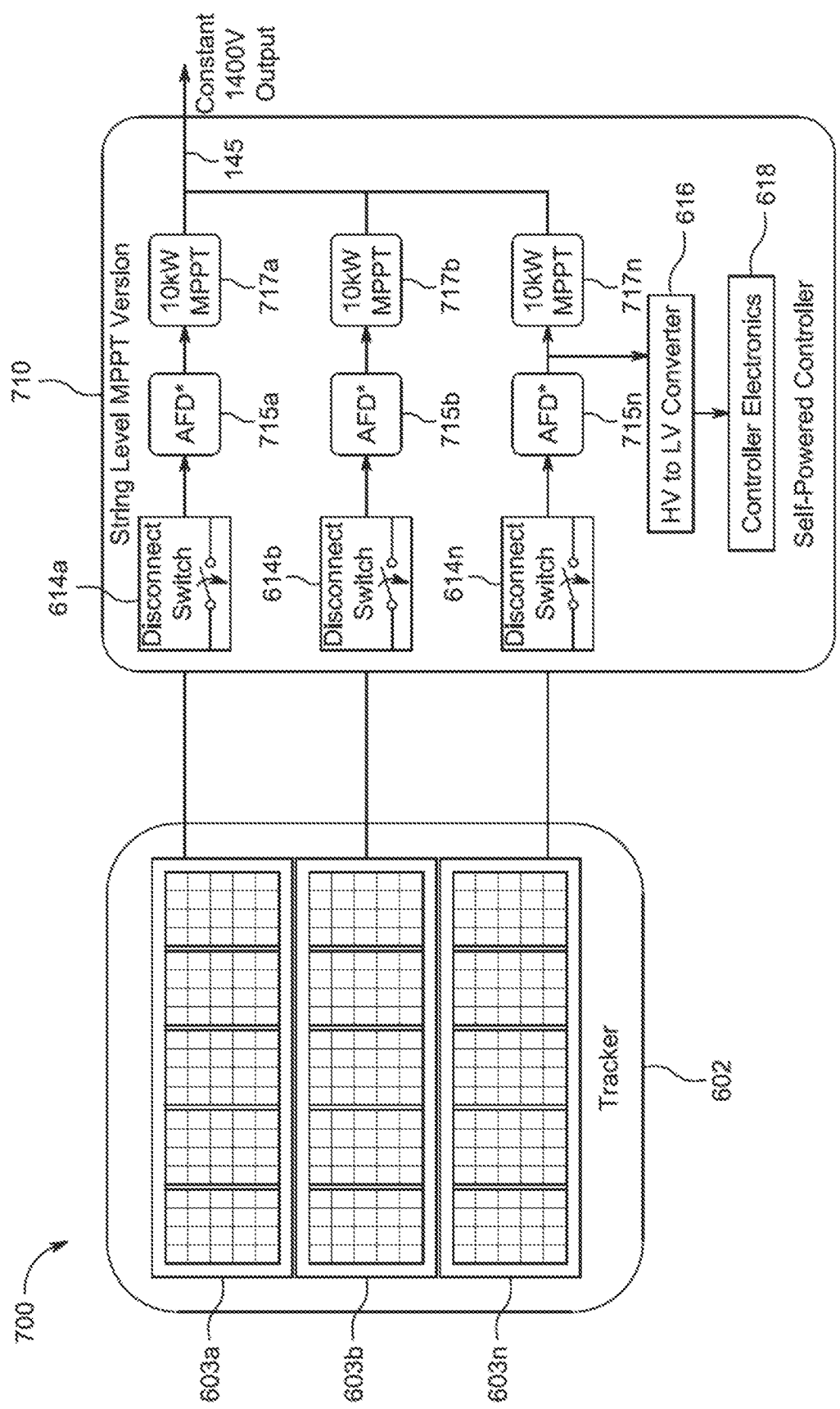

FIG. 7 depicts a string-level MPPT version of a solar tracker control system 700 according to another embodiment. The control system 700 includes a tracker 602 with PV arrays 603a-603n and a self-powered controller 710. The PV arrays 603a-603n are connected to respective disconnect switches 614a-614n. The disconnect switches 614a-614n, in turn, are connected to respective arc fault detectors 715a-715n. The arc fault detectors (AFDs) 715a-715n monitor and analyze patterns in electrical current and/or voltage waveforms output from respective PV arrays 603a-603n. When one or more of the AFDs 715a-715n sense a wave pattern indicating a potentially dangerous arc, one or more of the AFDs 715a-715n cause respective disconnect switches 614a-614n to open.

The arc fault detectors 715a-715n are connected to respective MPPT converters 717a-717n (e.g., 10 KW MPPT converters). The outputs of the MPPT converters 717a-717n are connected to the central inverter 102 via the DC bus 145 of FIG. 1. The output of the last arc fault detector 715n is also connected to a high voltage (HV) to low voltage (LV) converter 616, which converts the voltage output from the last PV string 603n to a lower voltage, which is used to power the controller electronics 618. Thus, the control system 700 features tracker-level power monitoring and string-level MPPT conversion (that is, the MPPT conversion is not just for each tracker 602 but for each of the PV strings or arrays 603a-603n).

Figure 8A:
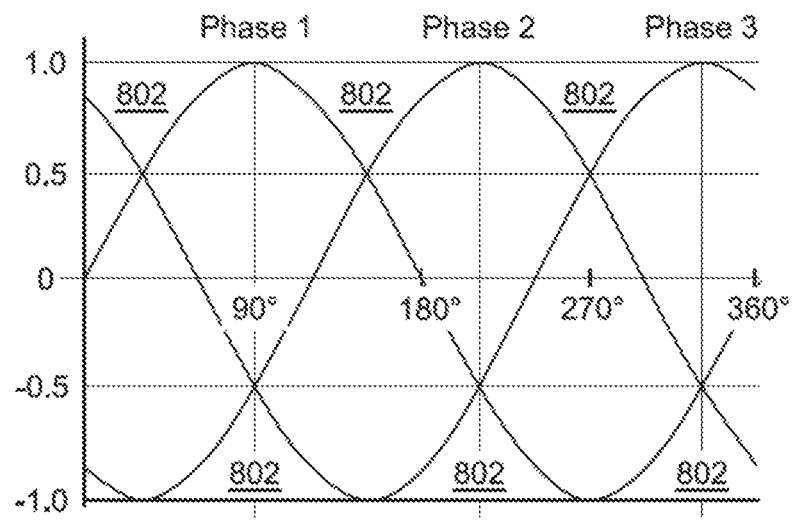
FIGS. 8A and 8B are graphs illustrating the benefits of DC power transmission.
Figure 8B:
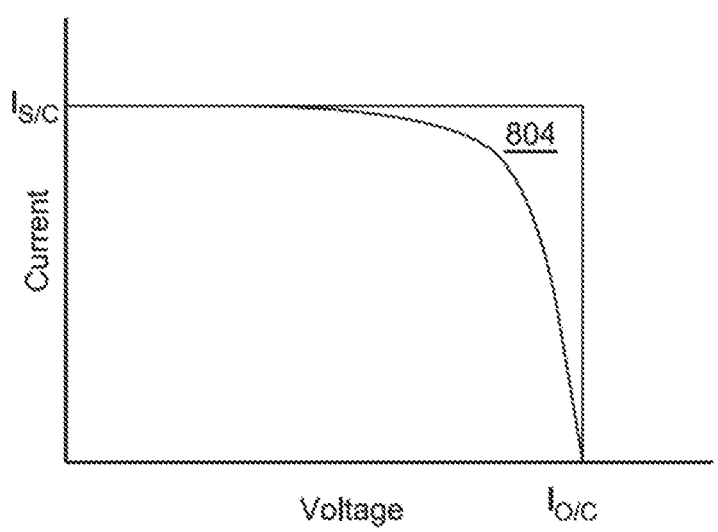

FIGS. 8A and 8B show graphs illustrating the benefits of constant direct current (DC) voltage transmission for a solar field. For the same voltage potential, DC is more efficient than AC for transmitting energy. As illustrated in the graph of FIG. 8A, the scaled three-phase AC waveform ranges between −1 V and +1 V. The differences between the scaled three-phase AC waveform and a constant +1 VDC or −1 VDC potential are shown as areas 802, which represent the efficiency gained from DC transmission. The energy generation in solar fields is DC for both solar and storage. All of the solar DC balance of system (BOS) are rated for both open circuit voltage Voc (for isolation) and short circuit current Isc (for the copper or conductor).

As illustrated in the graph of FIG. 8B, raising the transmission voltage close to the open circuit voltage Voc reduces approximately one third of the transmission current (represented by area 804) and eliminates approximately one third of the BOS cost. Also, maintaining constant voltage at the input to the centralized inverter 102 increases the capacity of the centralized inverter 102 by 20% to 50%. Further, a stable transmission voltage makes storage integration easier.

Figure 9:
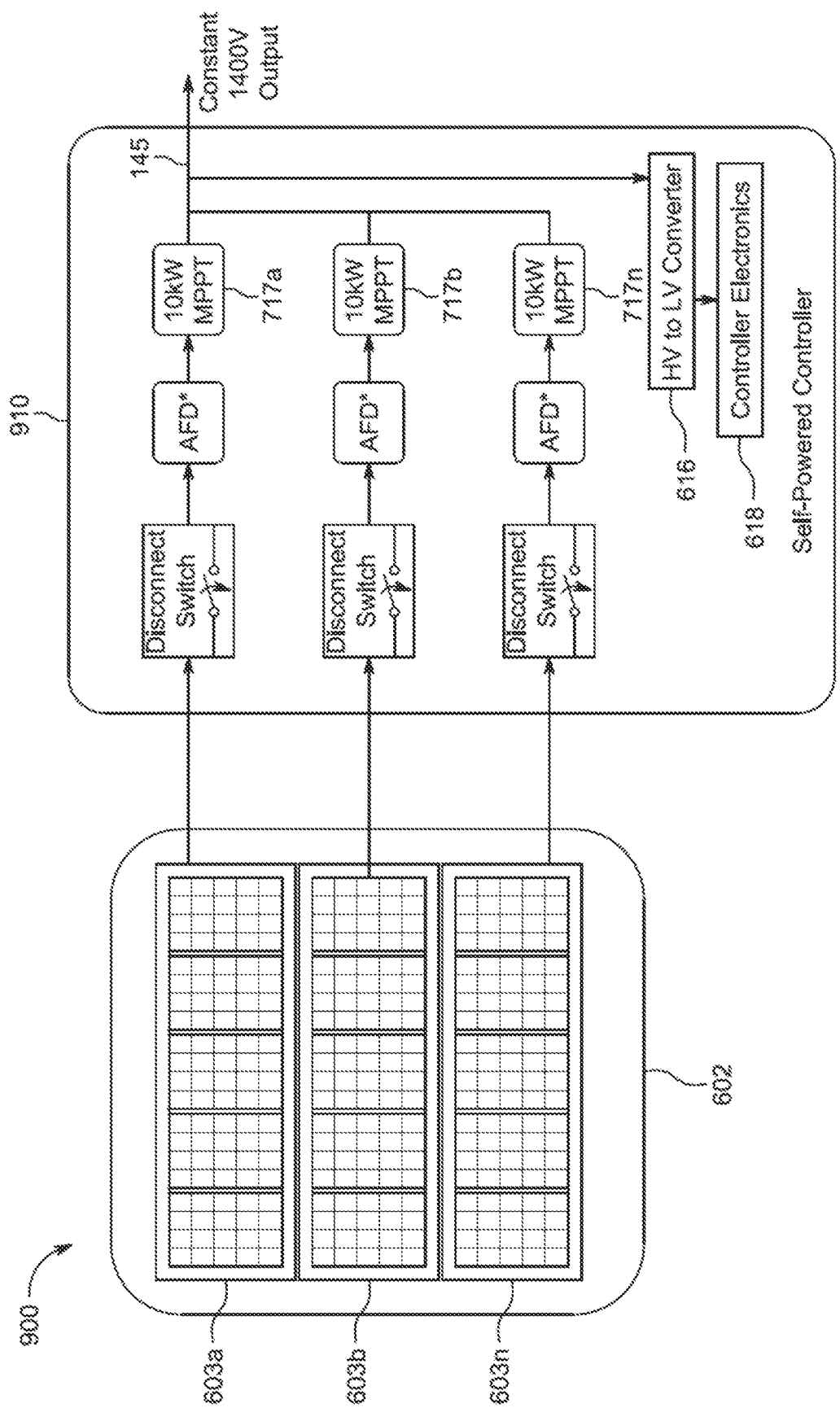
FIG. 9 is a schematic diagram of a control system according to another embodiment of this disclosure.
Figure 10:
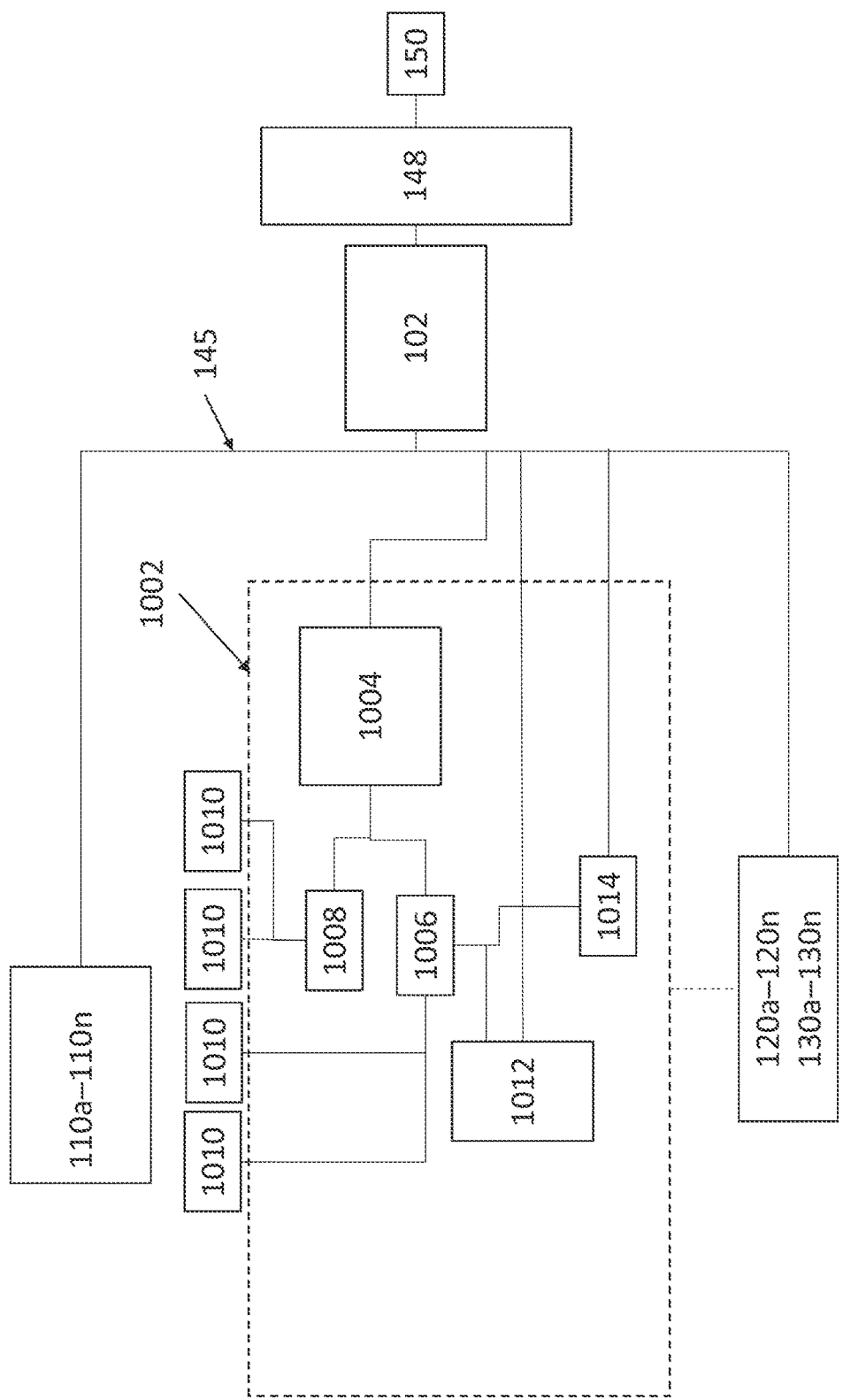
FIG. 10 is a hydrogen generation system in accordance with the disclosure.

FIG. 9 depicts a tracker power optimizer (TPO) system 900 according to an embodiment. The TPO system 900 maximizes solar power production and minimizes the mismatch between PV arrays 110a-110n. The TPO system 900 does this by utilizing string-level maximum power point tracking (MPPT) 112a-112n. String-level MPPT eliminates the mismatch between PV strings or arrays 110a-110n, which, for bi-facial solar modules, increases row efficiency by 1-2%. Also, string-level power monitoring is easy for operations and maintenance (O&M), thereby reducing O&M cost and increasing power production of the solar site. And string-level power monitoring provides real-time open circuit detection and detection of shading for both east-west and north-south directions. The TPO system 900 may use energy from the PV arrays 110a-110n for moving or positioning the tracker 602, which provides maximum space utilization on the tracker 602. The SPC 910 of the TPO system 900 is similar to the SPC 810 of FIG. 8 except that the HV-to-LV converter 616 is connected to the combined outputs of the MPPT converters 717a-717n.

In the configurations of FIGS. 6, 7, and 9, the control systems 600, 700, and 900 output a constant medium voltage (e.g., 1200 V to 1600 V) to the centralized inverter 102. By providing a constant medium voltage to the centralized inverter 102, the capacity of the centralized inverter 102 is increased.

A further aspect of the disclosure is directed to a hydrogen generation and hydrogen generator system. As the PV arrays 110a-110n generate electricity whenever exposed to light, there are times when their energy production capabilities exceed the demand of the fixed DC bus 145 by the grid 150. As described above, this excess production can be stored in the batteries 120a-120n, 130a-130n. However, when the batteries 120a-120n, 130a-130n approach capacity, the energy production from the PV arrays 110a-110n is "clipped." That is, it is lost. In some instances, the PV arrays 110a-110n may be angled such that their energy production is limited.

To prevent the energy production being "clipped," one aspect of the disclosure is directed to a system including a hydrogen generation system 1002. The hydrogen generation system 1002 may be connected to the fixed DC bus 145. Alternatively, the hydrogen generation system 1002 may draw directly from the batteries 120a-120n, 130a-130n such that they are both charging and discharging at the same time. Regardless of configuration, at times of excess energy production, the hydrogen generation system 1002 draws electrical energy from the fixed DC bus 145 and directs the energy to the hydrogen generator 1004. The hydrogen generator 1004 may for example be an electrolysis device configured to pass an electric current through water to form hydrogen gas and oxygen gas. Both the hydrogen and the oxygen may be captured, optionally compressed, and stored in separate vessels 1006 and 1008, these vessels may be above or below ground as needed. The vessels 1006 and 1008 may be configured for local storage of the hydrogen and oxygen. In accordance with one embodiment, the stored hydrogen and oxygen can be transferred to smaller vessels 1010 for shipment to other locations such as a power plant or hydrogen fuel station useable for automobiles and other equipment employing hydrogen fuel cells.

In one embodiment, a hydrogen powered gen-set 1012 may be employed locally proximal to the PV arrays 110a-110n. The gen-set may include for example a diesel engine or gas turbine drive generator. The hydrogen and oxygen are mixed into a combustible ratio and injected into an engine such as a diesel engine, gas turbine, Wankel engine, and others in order to be burned in the engine to rotate a shaft. The injection may of hydrogen and oxygen can be of just those two gasses, or they may be mixed with more traditional hydrocarbon fuels including diesel, kerosene, natural gas, propane, methane, and others to form the combustible mixture being used. That shaft is connected to an electrical generator, which by spinning in an electrical field generates electrical energy.

The electrical output of the electrical generator is connected to the fixed DC bus 145. In this manner, the excess energy developed by the PV arrays 110a-110n, which can neither feed the grid 150, not be captured in the batteries 120a-120n, 130a-130n can avoid being clipped or lost, and instead can be used to generate hydrogen which can be stored, effectively acting as a battery in that the hydrogen represents a store of energy. This hydrogen can be used locally in the hydrogen powered gen-set 1012, as described above, or may be directed via pipeline, truck or other means to locations and businesses that can utilize the hydrogen. These locations and businesses may include power plants also supplying the grid 150, hydrogen fuel stations where hydrogen powered cars may be fueled and others.

As an alternative to the hydrogen powered gen-set 1012, electrical energy may be produced from the stored hydrogen directly through the use of fuel cells 1014. As is known, fuel cells allow the hydrogen to pass through a membrane, by which electrons are stripped from the hydrogen to produce an electrical current. This produced electrical current may be a DC current which again may be conditioned and fed to the fixed DC bus 145.

As described herein, the fixed voltage DC Bus 145 serves as the backbone of a mixed source power plant. The fixed voltage DC bus allows for control of the energy produced by the PV arrays 110a-110n for grid 150 export, storage in the batteries 120a-120n, 130a-130n, and for hydrogen production without the need for any power conversion (i.e., DC to AC). While focused primarily on PV arrays 110a-110n, the instant application is not so limited and the sources of electrical energy may include wind power plants, hydroelectric power plants, geothermal power plants, bio-mass power plants, and more traditional gas and coal fired power plants as well as nuclear power plants. Further, though described in connection with the batteries 120a-120n, 130a-130n, those too are not necessarily required and in some embodiments the use of the hydrogen generation system 1002 alone may provide an adequate mechanism for storage for excess energy production.

Though generally described as having a central inverter 102, the disclosure is not so limited. In accordance with further aspects of the disclosure, the fixed voltage DC bus 145 is connected to a plurality of inverters 102, each of which can independently provide power to the gird 150 via their own AC transmission line 146 and transformer 148. The use of multiple inverters 102 allows for individual inverters 102 to be isolated from the fixed voltage DC bus 145 and from the grid 150 allowing for maintenance or replacement of the inverter 102, the AC transmission line 146 and transformer 148.

The instant disclosure is also not limited to those applications tied to the grid 150. Rather so called islanded solutions are also contemplated. For example, for remote operations or off-grid applications, where the power generated by the PV arrays 110a-110n will be locally consumed the generation of hydrogen solves several issues. Currently off-grid or islanded solutions typically require some additional, typically fossil fuel based, generator system. This is necessary because there are times when cloud cover and inclement weather limit the solar energy production. This then draws significantly more from the batteries 120a-120n, 130a-130n resulting is gradual drawdown in available energy. By generating hydrogen as described herein, the use of fossil fuels may be eliminated or reduced and replaced with hydrogen burning in a combustion engine or fuel cells (as described above). The result is an entirely self-sufficient power plant with little to no need for fossil fuels to be transported to the power plant.

As will be appreciated the fixed voltage DC bus 145 will require active management to ensure that clipping of solar power production is minimized and also that adequate energy is available to the fixed voltage DC bus 145 to meet the demand of the grid or load applied to the inverter 102. That management may be achieved using one or more of the DC-DC converters, combiners, controls, and transformers as described elsewhere herein. The management system would decide to export generated energy to the grid 150, store it in batteries 120*a*-120*n*, 130*a*-130*n*, or convert to hydrogen fuel based on which provides the greatest economic benefit for a given time.

In one example, the management system utilizes day-ahead predictions to determine when there is likely to be an excess amount of energy that can no longer be accommodated in the batteries 120*a*-120*n*, 130*a*-130*n*, and periods of low load (or low predicted load) as likely times for diversion of energy for hydrogen production. This may also account for and be designed to address various environmental factors. Still further, this active management can enable charged batteries 120*a*-120*n*, 130*a*-130*n* no forecasted energy demand to allow for conversion of the reserve energy into hydrogen for long term storage. This helps to minimize or eliminate the state of charge (SOC) drain of the batteries 120*a*-120*n*, 130*a*-130*n*.

A further aspect of this active management is to enable the addition or removal of capacity as needed. For example, hydrogen gen-sets 1012 can be added as peak demand increases for a given portion of the grid 150 or changes it nature to earlier or later in the day. Further batteries and fuel cells can be added to supplement the storage and energy production requirements and similarly can be decommissioned on market demand and evolving business needs for the power plant.

Though described herein as having a single vessels 106 and 1008 for the storage of hydrogen and oxygen, the disclosure is not so limited and the use of multiple, interconnected, expandable vessels that can store compressed or liquified hydrogen or oxygen for extended periods of time spanning 1-20 years is also contemplated. These features make the renewable system a long duration energy storage system.

The above systems are generally described in the context of an industrial scale power plant supplying the grid 150. But the systems described herein are not so limited and can be employed even in a residential or commercial setting to create opportunities to reduce reliance on the grid 150 for supply of power needs. In one example, the PV arrays 110*a*-110*n* may be a collection of roof top solar panels as is common throughout the United States. While they are generally configured to feed the grid 150, they need not be so limited. If there is a residential hydrogen generation capability, as described herein above, then the excess energy not consumed by the household can be used to generate and store hydrogen. In one example, this hydrogen can be utilized to provide fuel for Fuel Cell Electric Vehicles. Additionally, or alternatively, the homeowner or commercial building owner may incorporate a residential fuel cell or gen set 1012 to produce electricity from the stored hydrogen when the PV arrays 110*a*-110*n* cannot produce sufficient energy to meet the demand. This can further limit the connection to the grid 150 and reduce the energy bill for the homeowner or commercial building owner, and in some instances may enable them to "cut the cord" with the utility company altogether.

Yet a further embodiment, which does not necessarily require the generation of hydrogen, but may be employed as well relates to electric vehicle charging. With respect to commercial electric vehicle charging vendors, in instances where clipping of the solar power production might otherwise take place, electrical output can be directed to any electric vehicles that happen to be plugged in, this may be in conjunction with selling the excess energy at a discounted rate. In one aspect of the embodiment an agreement with electric vehicle owners indicates that they are never guaranteed charging of their vehicles, but if the system does happen to do so, they're receiving it at a discount. The system can also be programmed to wait for non-guaranteed discounted energy, but if it doesn't arrive in time, the system switches to pull guaranteed electricity at the standard rate. The system's algorithm can be smart enough to optimize for the system operator's returns.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A distributed direct current (DC) power system comprising:
    an inverter configured to invert DC to alternating current (AC), the inverter coupled to a DC bus;
    a plurality of photovoltaic (PV) strings;
    a plurality of maximum power point tracking (MPPT) converters coupled between the plurality of photovoltaic (PV) strings and the DC bus, the plurality of MPPT converters configured to maximize solar power production by the plurality of PV strings and minimize mismatch between the plurality of PV strings;
    a plurality of batteries coupled to the DC bus and configured to store excess solar power generated by the plurality of PV strings;
    a plurality of DC-DC battery converters (DCBC) coupled between the plurality of batteries and the DC bus, the plurality of DCBCs configured to manage charge and discharge of the plurality of batteries and supply a constant DC voltage to the inverter via the DC bus;
    a hydrogen generation system in electrical communication with the plurality of PV strings and the plurality of batteries via the DC bus, the hydrogen generation system configured to draw power from the DC bus that is generated by the plurality of PV strings and that is unable to be fed to a load or to the plurality of batteries to generate hydrogen gas.

2. The power system of claim 1, wherein the DC bus is a fixed DC bus.

3. The power system of claim 1, wherein the hydrogen generation system includes a hydrogen generator.

4. The power system of claim 3, wherein the hydrogen generation system further includes a plurality of vessels coupled to the hydrogen generator.

5. The power system of claim 4, wherein a first vessel of the plurality of vessels is configured to store hydrogen and a second vessel of the plurality of vessels is configured to store oxygen.

6. The power system of claim 4, wherein the plurality of vessels includes a plurality of portable vessels.

7. The power system of claim 4, wherein the hydrogen generation system further includes a hydrogen-powered gen-set coupled to a vessel of the plurality of vessels and positioned in proximity to the plurality of PV strings.

8. The power system of claim 4, wherein the hydrogen generation system further includes a fuel cell fluidically coupled to a vessel of the plurality of vessels.

9. The power system of claim 8, further comprising a DC bus electrically coupled to the fuel cell.

10. The power system of claim 1, wherein the constant DC voltage is a constant, medium DC voltage.

11. The power system of claim 1, further comprising one or more hydrogen fuel cells configured to generate electricity using the hydrogen gas generated by the hydrogen generation system.

12. The power system of claim 11, wherein the one or more hydrogen fuel cells are coupled to a fixed DC bus.

13. The power system of claim 1, further comprising a management system, the management system configured to minimize clipping of solar power produced by the plurality of PV strings.

14. The power system of claim 13, wherein the management system comprises one or more of the plurality of DCBCs, the plurality of MPPTs, or the inverter.

15. The power system of claim 1, wherein the hydrogen generation system is further configured to draw power from the plurality of batteries to generate hydrogen gas.

* * * * *